United States Patent [19]
Totschnig

[11] 3,722,629
[45] Mar. 27, 1973

[54] DEVICE FOR INDICATING THE ACTUATED POSITION OF A MANUAL BRAKE AND OF THE WEAR OF THE BRAKE LINING, ESPECIALLY FOR MOTOR VEHICLES

[75] Inventor: Manfred Totschnig, Wolfsburg, Germany

[73] Assignee: Volkswagenwerk Aktiengesellschaft, Wolfsburg, Germany

[22] Filed: Apr. 8, 1971

[21] Appl. No.: 132,284

[30] Foreign Application Priority Data

Oct. 31, 1970 Germany............P 20 24 661.1

[52] U.S. Cl................................188/1 A, 340/52 A
[51] Int. Cl..............................................F16d 66/02
[58] Field of Search......188/1 A; 200/61.4; 340/52 A, 340/52 B

[56] References Cited

UNITED STATES PATENTS 3,339,676  9/1967  Quinn.......................188/1 A

*Primary Examiner*—Duane A. Reger
*Attorney*—Ernest F. Marmorek

[57] ABSTRACT

In a brake having a plurality of relatively movable brake elements, a device for selectively moving the brake elements manually and/or by foot relative to each other, and an adjusting device to adjust the distance between the brake elements upon their wear, a device for indicating when the brake elements have been actuated manually and when a predetermined wear between the brake elements has been exceed, the indicating device includes a force transmitting arrangement associated with the manual moving device and with the adjusting device and adapted to move along a predetermined path upon actuation by the two last-mentioned devices, and an electric contact located in the above path and actuated by the force transmitting device upon movement thereof along the above path, the contact forming part of a signal circuit becoming energized upon actuation of the contact.

9 Claims, 4 Drawing Figures

INVENTOR:
MANFRED TOTSCHNIG,
BY
His ATTORNEY.

DEVICE FOR INDICATING THE ACTUATED POSITION OF A MANUAL BRAKE AND OF THE WEAR OF THE BRAKE LINING, ESPECIALLY FOR MOTOR VEHICLES

BACKGROUND OF THE INVENTION

The present invention relates to a device for indicating the "actuated" position of a manual brake and for indicating the wear of the lining of a brake. The invention is especially concerned with a device of this type for a brake of a motor vehicle, with an automatic adjusting device and with electrical contacts.

With mechanical friction brakes it is not only desirable to have a warning device for indicating the wear of brake linings. It is also considered advantageous that the "actuated" position of the manual brake is indicated by a signal. Consequently, monitoring devices have become known for indicating the "actuated" position of a manual brake and of the wear of the brake linings. However, with such prior art devices one separate signal circuit each and several contacting means are required. Consequently, these prior art devices are, cumbersome and expensive.

It is, therefore, an object of the present invention to provide a monitoring device for the position of a manual brake and for the wear of a brake lining, which is considerably simplified over prior devices of this type.

BRIEF SUMMARY OF THE INVENTION

The above mentioned object has been realized in accordance with the present invention by providing a device in which the actuated position of the hand brake and of the brake lining wear is indicated by a single signal circuit with one contact only. This contact is located in the path of a force transmitting member associated with the manual brake device and the brake adjusting device. The force transmitting member carries out movements which influence the contact after reaching a predetermined maximum value of brake lining wear if the brake is actuated by foot as well as upon actuation of the manual brake.

In accordance with a further embodiment of the invention, the adjusting device is provided with means for limiting the maximum length of adjusting path and is connected with the force transmitting member in such a manner that the latter carries out a contact actuating movement upon exceeding the maximum adjusting path. The force transmitting member may consist of a lever which is usually already a part of the manual brake device. In this case, the lever is on one hand physically connected to one brake shoe in a manner known per se and is connected with the adjusting device designed in the form of a pressure rod, and on the other hand rests against an abutment serving as a counter-bearing and connected with the contact. This abutment is arranged in the vicinity of that end of the lever that is connected with the manual brake wire. Furthermore, the abutment is either fixedly connected to the carrier of the brake or to the ridge of a brake shoe. In a further development, the contact itself may be designed to as to form the abutment for the force transmitting member.

It is furthermore possible to make the contact-arranged in the path of movement of the force transmitting member-resilient. In still another embodiment the contact may form a switch with a contacting push rod.

It should be kept in mind that the invention is not limited to brakes which are equipped with an automatic adjusting device. On the contrary, it is also applicable in a very advantageous manner to brakes the gap or play of which has to be adjusted manually. In this instance, there exists the additional problem of designing the monitoring device for the indication of the wear of the brake lining in such a manner that also intermediate brake wear limits are indicated so that the brake can then be adjusted by hand.

This problem has been solved, in accordance with the present invention, by associating the force transmitting member with the brake shoe through the intervention of means which, upon actuation of the brake by foot, form a non-positive connection, such as by spring force, between the force transmitting member and the brake shoe only if the wear of the brake lining exceeds the above-mentioned gap or play. The last mentioned means may consist of a pressure rod with a device defining the gap or play and the pressure rod may be a part of the manual adjusting device.

An advantageous further development of the invention is characterized in that the force transmitting member consists of a lever, which is usually a part of the manual brake device already. The lever is, in a manner known per se, pivotally connected to the brake shoe and is connected with one end with the pressure rod which in turn is journaled at the other brake shoe via an oblong hole defining the gap or play and a bolt guided in said oblong hole. Finally, it is also possible to equip the manually actuable adjusting device with means for limiting the adjustment.

BRIEF DESCRIPTION OF THE DRAWINGS

The invention is illustrated by way of example, in the attached drawings, in which.

DETAILED DESCRIPTION OF PREFERRED EMBODIMENTS OF THE INVENTION

Figure 1:
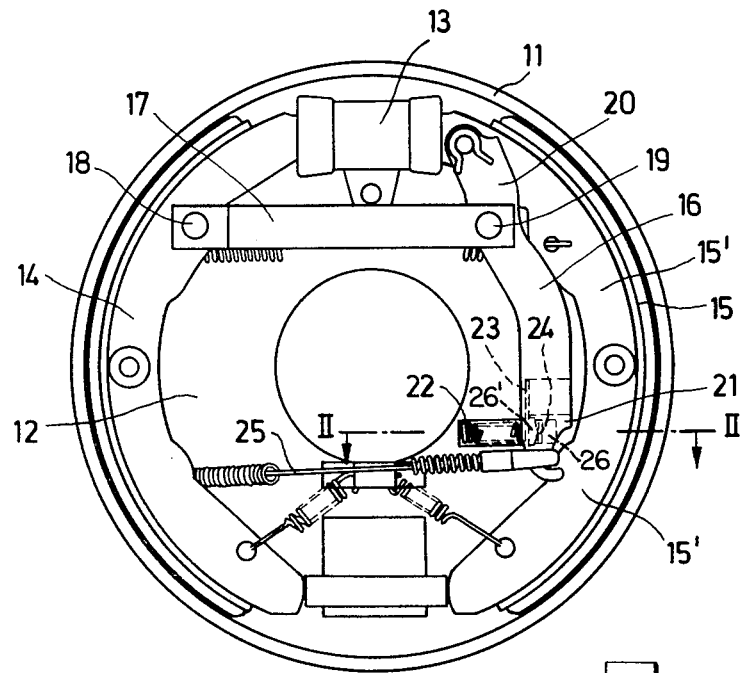
FIG. 1 is a side view of a brake, with internally arranged brake shoe, designed in accordance with the present invention.
Figure 2:
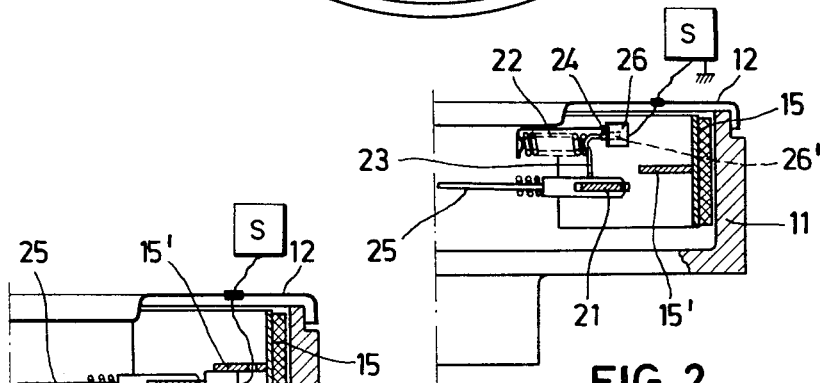
FIG. 2 is a section taken along the line to II—II of FIG. 1.

Referring now to the drawing in detail, and FIGS. 1 and 2 in particular, the brake shown therein comprises a brake drum 11, a brake carrier member 12, and a wheel cylinder 13. Two brake shoes 14 and 15 respectively are interconnected by means of a two-arm lever 16 and an adjusting device 17 in the form of a pressure rod. Adjusting device 17 is on one hand connected to brake shoe 14 and on the other hand to lever 16, by means of bolts 18 and 19 respectively.

One end 20 of lever 16 is pivotally connected to brake shoe 15 in the vicinity of cylinder 13, whereas it rests at its other, free end 21 against an abutment 24 connected to the carrier member 12, in the embodiment as shown in FIGS. 1 and 2, an angular piece 23 is connected to the free end 21 of the lever 16 and is urged against the abutment 24 by a spring 22

A cable 25 is attached to the free end 21 of the lever 16 for purposes of actuating the latter. Abutment 24 is provided with an electric contact 26 in the form of a switch. This switch is one component of a signal circuit S and is designed like a door contact switch the contact push rod 26° of which is located in the path of movement of the angular piece 23 of the lever 16.

Upon actuation of the manual brake device, by means of cable or wire 25, lever 16 is moved away from abutment 24 and the contact push rod 26' of the switch actuating the contact 26, is actuated.

In contrast thereto, upon actuation of the brake by foot, the lever 16 is actuated by cylinder 13 and its end 21 remains in contact with the abutment 24 while the resistance of the adjusting device 17 to adjustment is compensated for by spring 22. Only after a certain maximum value of brake lining wear has taken place, the lever 16 lifts off abutment 24 and again actuates contact 26. This feature is being accomplished in the illustrated embodiment by providing the pressure rod-like adjusting device 17 with means for limiting the maximum adjusting path.

Figure 3:
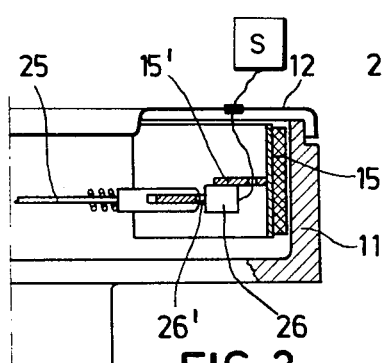
FIG. 3 is a section similar to that of FIG. 2 but through a brake modified over that of FIGS. 1 and 2.
Figure 4:
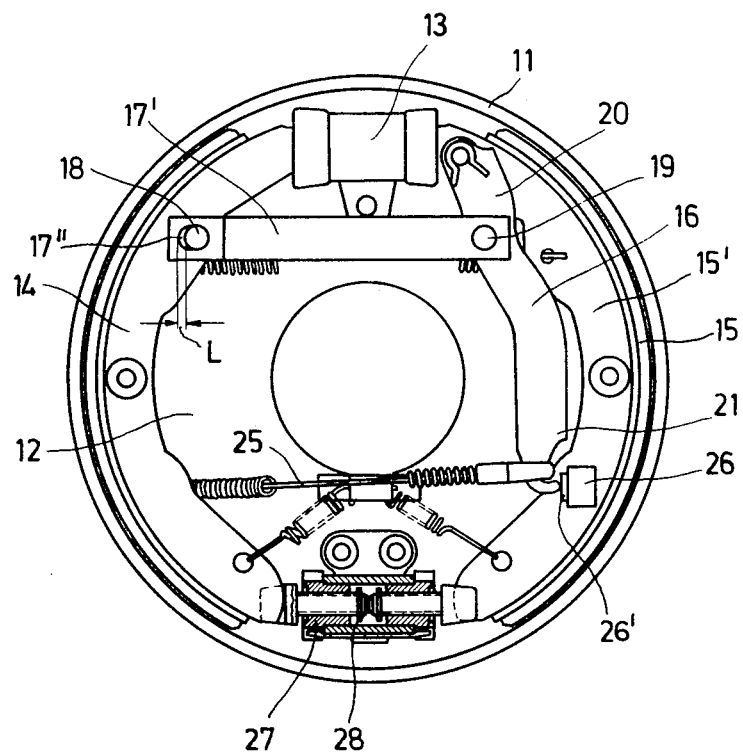
FIG. 4 illustrates a still further embodiment of a brake designed in accordance with the present invention.

As shown in FIGS. 3 and 4, the abutment 24' shown therein can also be provided at the ridge 15' of brake shoe 15.

In the embodiment shown in FIG. 4, both brake shoes 14, 15 are connected to each other through the intervention of a lever 16 and a pressure rod 17'. This pressure rod is on one hand connected to brake shoe 14 and on the other hand to lever 16 by means of bolts 18 and 19 respectively. Bolt 18 connected to brake shoe 14 is guided in an oblong hole 17" which defines a play L between the shoe 14 and the pressure rod 17'.

Upon actuation of the manual brake device, lever 16 is moved from abutment 24' by cable or wire 25 whereby contact 26 of the switch is actuated. In contrast thereto, upon actuation of the brake by foot lever 16 remains in contact with abutment 24' with its end 21 until L the play of the bolt 18 in oblong hole 17" has been limited in one direction due to wear of the brake lining. As soon as this condition has been reached lever 16 is being taken along by pressure rod 17', it lifts off abutment 24' with its free end 21, and thereby actuates contact 26. Consequently this condition indicated that the gap or play L of the brake has to be readjusted. This adjustment can be effected manually in a manner known per se by an adjusting device 27. This adjusting device 27 controlled by a limiting means 28 which permits repeated adjustment only if the brake lining has not yet worn to such an extent that total replacement becomes necessary.

As has been mentioned before, the manually actuable adjusting device such as device 27, can be provided at the pressure rod 17. It is, however, also possible to provide for the adjustment of the play or gap in a manner different than shown here, as will be obvious to an expert in this field.

As will be evident from the above, the device according to the present invention makes it possible to indicate the position of the manual brake as well as the limits of brake lining wear of a brake with one single contact in a single circuit. The invention also yields the advantage that by actuation of the manual brake the proper functioning of the circuit and thereby of the brake wear indicating means is being controlled and monitored.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

I claim:

1. A braking system having a pair of brake elements movable relative to each other, first control means operable for moving said brake elements in opposite directions between a normal position and a braking position;

second control means operable for selectively moving said brake elements between said positions irrespective of said first control means, comprising, in combination, a pressure link connected near one end thereof with a predetermined play to one brake element, a two-armed lever having one arm thereof connected to the other brake element, and its fulcrum connected near the free end of said pressure link;

the other arm of said lever being coupled to said second control means; and a signal device including a limit switch located in the path of movement of said lever to actuate said signal device when said second control means is actuated, or when the wear of said elements exceeds said predetermined play and said first control means is actuated.

2. The braking system according to claim 1, further comprising abutment means located in the path of movement of said other arm of said lever and supporting said limit switch, said limit switch being normally engaged by said other arm.

3. The braking system according to claim 1, wherein said pressure link defines at said one end an oblong hole and said one element is connected to said pressure link by a bolt guided in said oblong hole.

4. The braking system according to claim 1, further including adjusting means for limiting the maximum permissible distance between said elements upon wear thereof, and wherein said adjusting means is said force transmitting means so that the latter actuates operable for readjusting said play when said maximum permissible wear has been reached.

5. The braking system according to claim 2 wherein said abutment means is stationarily arranged at said brake.

6. The braking system according to claim 2, wherein said relatively movable elements include a stationary brake drum and a brake shoe, and wherein said abutment means is connected to said brake shoe.

7. The braking system according to claim 2, wherein said limit switch and said abutment means form one structural unit.

8. The braking system according to claim 2, wherein said limit switch is designed as a resiliently yieldable contact.

9. The braking system according to claim 1, wherein said limit switch includes a switch push rod.

* * * * *